United States Patent
Gethings et al.

(10) Patent No.: US 10,500,685 B2
(45) Date of Patent: Dec. 10, 2019

(54) TENSIONER

(71) Applicant: Tentec Limited, W Brom, Birmingham W Midlands (GB)

(72) Inventors: Michael Gethings, Wolverhampton (GB); David Evans, Dudley (GB)

(73) Assignee: TENTEC LIMITED, Birmingham West (GB)

( * ) Notice: Subject to any disclaimer, the term of this patent is extended or adjusted under 35 U.S.C. 154(b) by 0 days.

(21) Appl. No.: 15/116,988

(22) PCT Filed: Feb. 6, 2014

(86) PCT No.: PCT/GB2014/050349
§ 371 (c)(1),
(2) Date: Aug. 5, 2016

(87) PCT Pub. No.: WO2015/118283
PCT Pub. Date: Aug. 13, 2015

(65) Prior Publication Data
US 2017/0203397 A1    Jul. 20, 2017

(51) Int. Cl.
*B23P 19/06* (2006.01)
*B25B 29/02* (2006.01)
(Continued)

(52) U.S. Cl.
CPC ............ *B23P 19/067* (2013.01); *B25B 29/02* (2013.01); *F16B 31/043* (2013.01); *G01L 1/12* (2013.01)

(58) Field of Classification Search
CPC ...... B23P 19/067; B25B 29/02; F16B 31/043; G01L 1/12
(Continued)

(56) References Cited

U.S. PATENT DOCUMENTS 3,722,332 A * 3/1973 Jones .................. B25B 29/02
                                                            254/29 A
3,995,828 A * 12/1976 Orban .................. B23P 19/067
                                                            254/29 A
(Continued)

FOREIGN PATENT DOCUMENTS

DE        2455788 A1    8/1976
DE    102012102855 A1   10/2013
(Continued)

*Primary Examiner* — Hadi Shakeri
(74) *Attorney, Agent, or Firm* — Howson & Howson LLP

(57) ABSTRACT

A tensioner, typically hydraulic, for threaded members, the tensioner comprising: a base (4) and a piston (6) defining a pressure space (13) therebetween, the base (4) and piston (6) being arranged to be urged apart along an axis (17) upon introduction of a fluid into the pressure space (13); and a thread-engaging member (7), comprising a body portion (8) of the form of a sleeve and having a threaded interior (30) for engagement with a threaded member (2) and a piston engaging portion (9) carrying a protrusion; in which the piston (6) bears against the protrusion such that the piston (6) exerts a force on the protrusion when urged apart from the base (4) by the introduction of fluid into the pressure space (13); the tensioner further comprising a displacement sensor arranged to determining the relative position of the body portion of the thread-engaging member and the base, the displacement sensor comprising a first part (12) carried on the base (4) and a second part (11) carried on the body portion (8); typically the displacement sensor is a magnetic encoder.

20 Claims, 3 Drawing Sheets

(51) Int. Cl.
*F16B 31/04* (2006.01)
*G01L 1/12* (2006.01)

(58) Field of Classification Search
USPC ........................................................ 81/57.38
See application file for complete search history.

(56) References Cited

U.S. PATENT DOCUMENTS

| | | | | |
|---|---|---|---|---|
| 4,535,656 A | * | 8/1985 | Orban | B23P 19/06 376/260 |
| 4,914,389 A | | 4/1990 | Juds | |
| 5,101,694 A | * | 4/1992 | Sevelinge | B23P 19/06 81/57.24 |
| 5,398,574 A | * | 3/1995 | Spirer | B25B 13/463 81/57.38 |
| 5,452,629 A | * | 9/1995 | Heiermann | B23P 19/067 254/29 A |
| 5,951,222 A | * | 9/1999 | Gosling | B23P 19/067 29/452 |
| 6,851,324 B2 | * | 2/2005 | Islam | G01L 3/109 73/862.328 |
| 8,261,421 B2 | * | 9/2012 | Monville | B23P 19/067 29/407.01 |
| 9,222,806 B2 | * | 12/2015 | Gustafsson | G01D 5/2073 |
| 9,375,959 B2 | * | 6/2016 | Liggett | B41J 19/207 |
| 9,981,369 B2 | * | 5/2018 | Hohmann | B25B 29/02 |
| 2004/0129118 A1 | * | 7/2004 | Junkers | B25B 21/005 81/429 |
| 2010/0116101 A1 | * | 5/2010 | Dral | B23P 19/066 81/467 |
| 2010/0207617 A1 | * | 8/2010 | Novak | G01D 5/145 324/207.25 |
| 2015/0061650 A1 | | 3/2015 | Strietzel | |
| 2017/0095896 A1 | * | 4/2017 | Hohmann | B23P 19/067 |

FOREIGN PATENT DOCUMENTS

| | | |
|---|---|---|
| EP | 2361722 A1 | 8/2011 |
| EP | 2522465 A1 | 11/2012 |
| JP | H03-204406 A | 9/1991 |
| WO | 2008/072957 A1 | 6/2008 |
| WO | 2013/117807 A1 | 8/2013 |

* cited by examiner

TENSIONER

CROSS-REFERENCE TO RELATED APPLICATIONS

This application is a national stage of International Patent Application No. PCT/GB2014/050349, filed Feb. 6, 2014, which application is incorporated herein by reference.

BACKGROUND OF THE INVENTION

This invention relates to tensioners for threaded members.

Tensioners are commonly used for, amongst other tasks, stretching items such as bolts or studs, so that a threaded nut can then be run down the stretched bolt, thus capturing the tension in the stretched bolt. Typically, they are used in any field that requires large loads to be secured by the use of threaded fasteners; one common use is in wind turbines, when such tensioners can be used to secure many fastenings, such as the turbine blades to their bearing, or the tower of such a turbine to its foundations.

It is desirable to know the elongation of the threaded member, particularly in situations where the traceability of the attachment of the nut on the threaded member is important, such as in the example of wind turbines discussed above. Whilst it is, to some extent, possible to calculate the elongation of the threaded member by using the pressure of the hydraulic fluid introduced into the pressure space in combination with the material dimensions and properties of the bolt, this is however not a particularly reliable measure.

It is also possible to measure the elongation of the threaded member ultrasonically; a fixed ultrasound transducer emitting ultrasound waves onto the end of the threaded member can measure the distance to the end of the threaded member by measuring the time of flight of the reflected ultrasound waves off the end of the threaded member. However, such equipment is cumbersome to set up and is difficult to calibrate.

Hydraulic tensioners are well known in the art; examples of the same can be seen in the European Patent Application published as EP 2 522 465 and in the Japanese Patent Application published as JP3-204406. Such tensioners can be used to stretch a threaded member such as a stud, bolt or the like, and generally comprise inner and outer coaxial generally cylindrical annular bodies which are placed around the threaded member. The inner body threadedly engages the threaded member. A space between the inner and outer bodies defines a pressure space, into which fluid, typically hydraulic fluid, can be introduced to drive the bodies apart along their common axis.

It has been proposed, in the two patent application publications to which reference is made above, to use a special threaded member which has a central bore. A rod is placed into the central bore, and a measuring apparatus clamped to the end of the threaded member. The movement of the measuring apparatus relative to the rod then gives a measurement of the elongation of the threaded member. However, this again requires access to the end of the threaded member and requires significant clearance at the end of the threaded member.

BRIEF SUMMARY OF THE INVENTION

It is an object of the invention to overcome the drawbacks of prior art, such as the problem of obtaining a reliable measurement of the elongation of the threaded member, particularly in the situation where access to the space around the threaded member is limited. Furthermore, it is desirable to provide a tensioner that can be used conveniently with a plurality of differently sized threaded members, without requiring the threaded members to be specially formed.

DETAILED DESCRIPTION OF THE INVENTION

Figure 1:
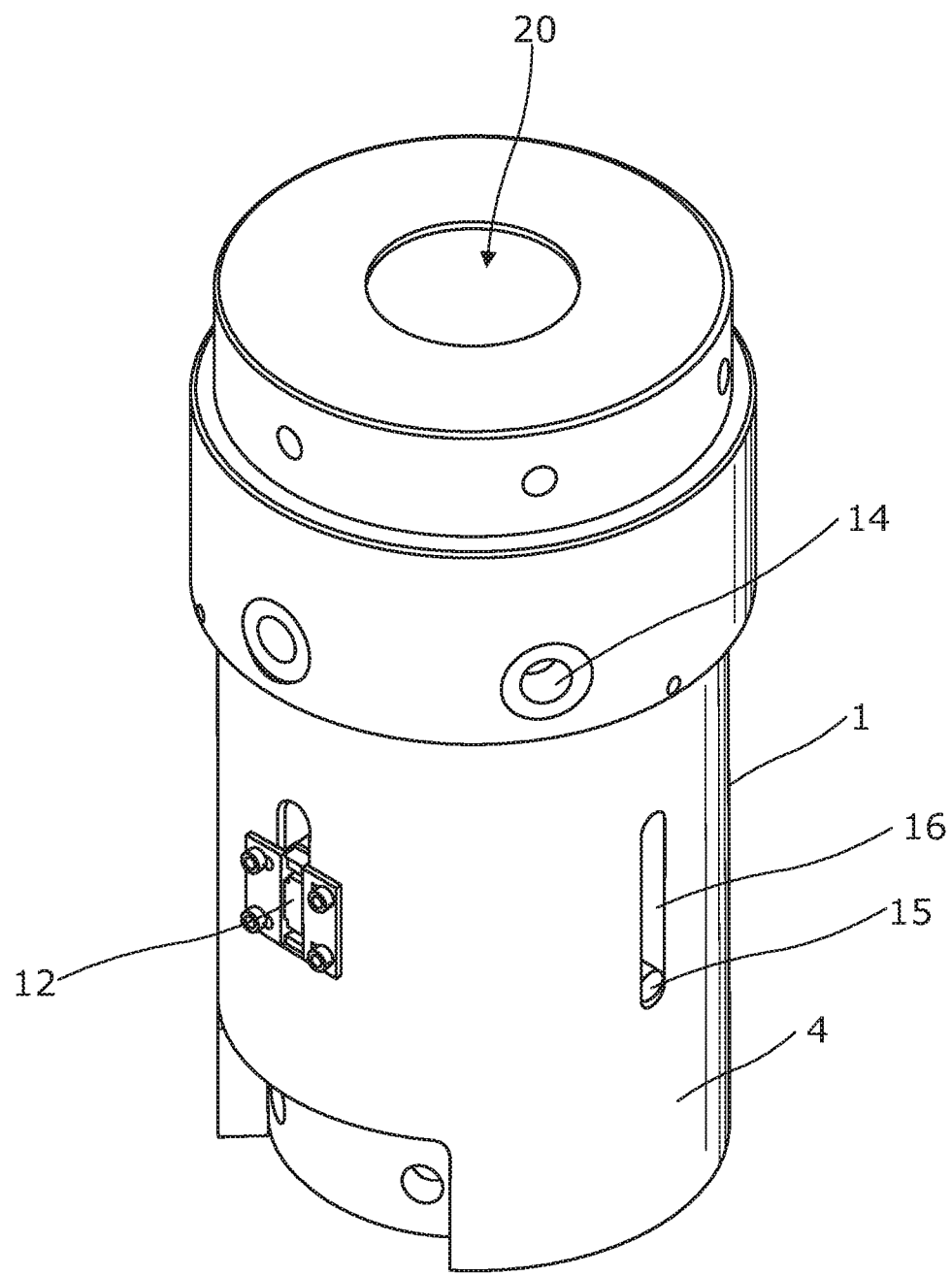
FIG. 1 shows a perspective view of a hydraulic tensioner in accordance with an embodiment of the invention.
Figure 2:
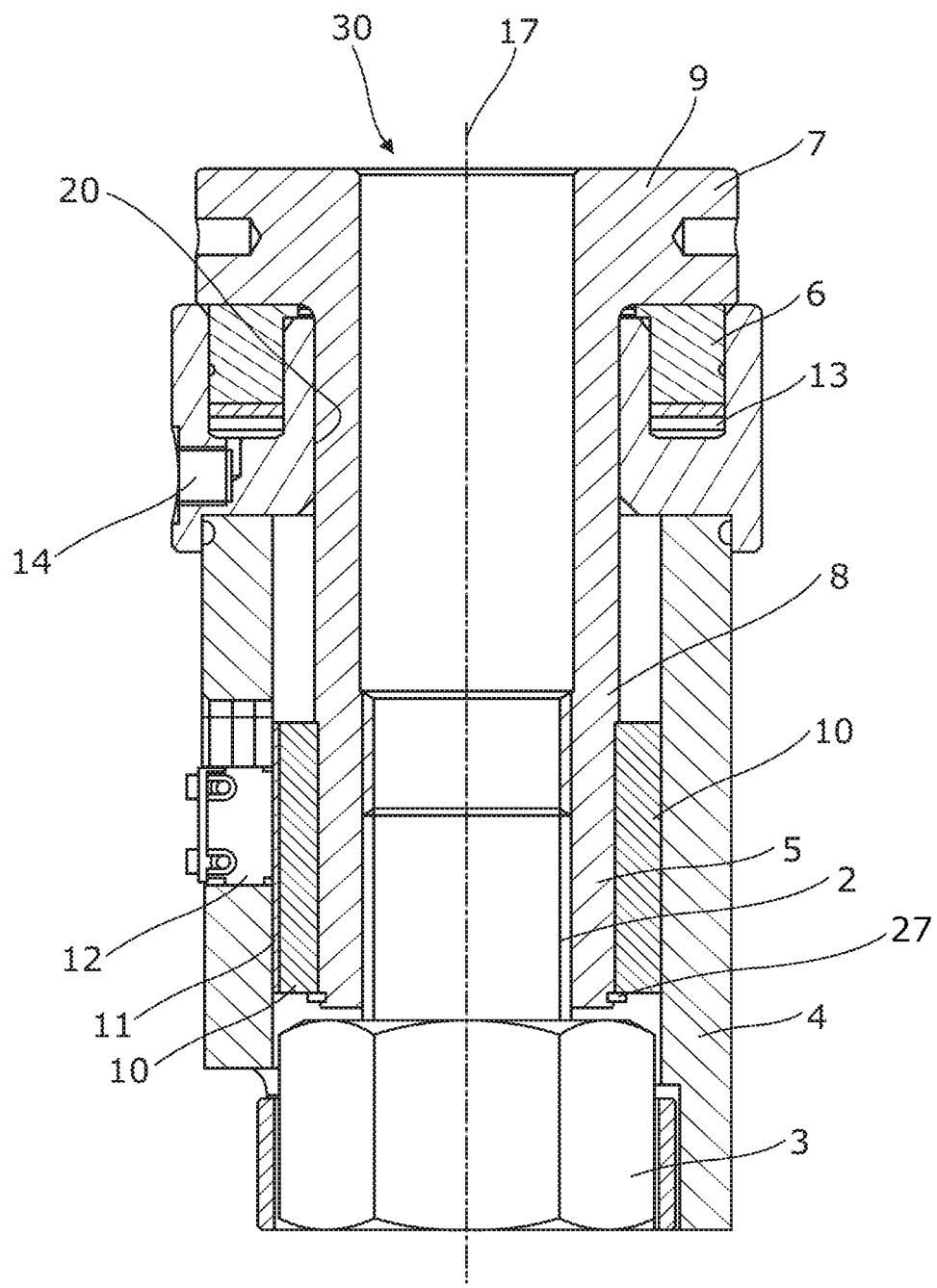
FIG. 2 shows a vertical cross section through the tensioner of FIG. 1, through a central plane.
Figure 3:
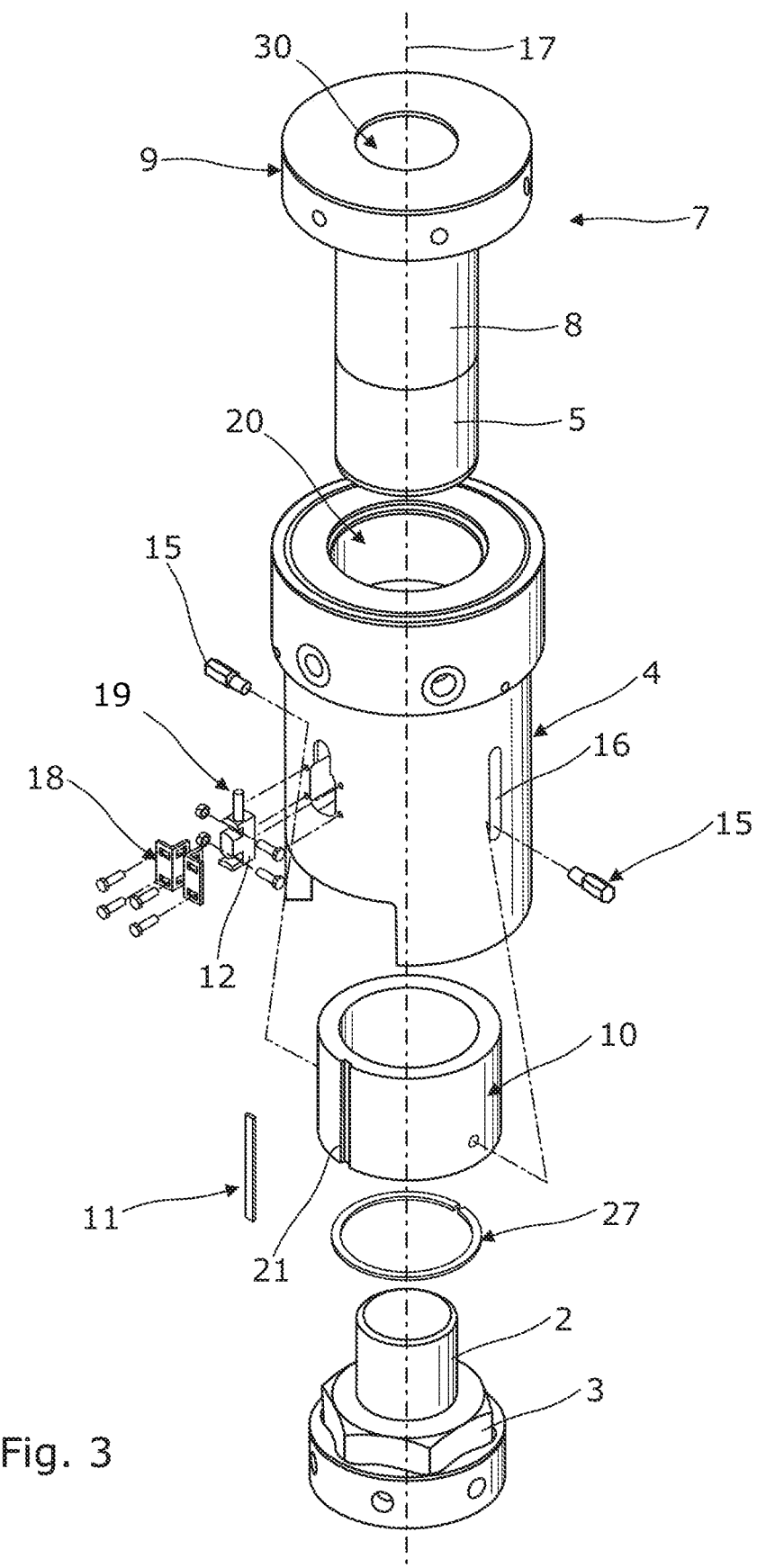
FIG. 3 shows an exploded perspective view of the tensioner of FIG. 1.

According to a first aspect of the invention, we provide a tensioner for threaded members, the tensioner comprising:
- a base and a piston defining a pressure space therebetween, the base and piston being arranged to be urged apart along an axis upon introduction of a fluid into the pressure space; and
- a thread-engaging member, comprising a body portion of the form of a sleeve and having a threaded interior for engagement with a threaded member and a piston engaging portion carrying a protrusion;
- in which the piston bears against the protrusion such that the piston exerts a force on the protrusion when urged apart from the base by the introduction of fluid into the pressure space;
- the tensioner further comprising a displacement sensor arranged to determining the relative position of the body portion of the thread-engaging member and the base, the displacement sensor comprising a first part carried on the base and a second part carried on the body portion.

As such, by determining the relative position of the body portion relative to the base, it is possible to measure the elongation of the threaded member. This provides a more reliable method of measuring elongation of the threaded member than prior art methods and does not require the use of special threaded members as the displacement sensor is carried on the tensioner rather than engaging the threaded member directly.

Thus, if the base is arranged to abut a surface fixed relative to the threaded member, the piston, on introduction of the fluid into the pressure space, will be urged away from the base along the threaded member, so as to place the threaded member in tension. If a nut is run along the threaded member to abut the fixed surface, the tension generated in the threaded member can be stored and applied to the fixed surface. The bolt tensioner can then be released and removed, leaving a fastened nut and threaded member.

In this way, the threaded member and nut can be used to fasten a plurality of objects together; this can be most easily be seen in the case where the threaded member is a bolt where a number of objects of sheet form can be held between the nut and the head of the bolt.

Use of a separate thread-engaging member, which engages the threaded member and is acted upon by the piston, allows, for example, a variety of thread-engaging members to be provided which engage a variety of differently sized threaded members, as the interior of the thread-engaging member can be selected for the threaded member in question; a plurality of such threaded members can therefore be provided. A further advantage is that the sensor parts easily can be exchanged and stored.

Furthermore, we have appreciated that, by measuring closer to the base of the threaded member rather than at the end of the threaded member (typically on the portion of the thread-engaging member that is engaging the thread of the threaded member), measurements of the elongation are more accurate, in that the elastic deformations of the tensioner itself will be less pronounced closer to the base of the threaded member.

The displacement sensor may be a linear encoder, where one of the first and second parts comprises a scale that encodes a position and the other of the first and second parts is a transducer that reads the scale. Because the first and second parts are mounted on parts that move relative to one other, the transducer will see movement of the scale, and so be able to measure the relative movement. In one example, the scale will be a magnetic encoder, with the scale encoded magnetically, for example as a series of alternating magnetic poles along the scale or by varying the magnetic permeability of the scale along its length. In such a case, the transducer will be a magnetic field sensor, such as a Hall effect sensor. Alternatively the scale can be encoded optically, capacitively or inductively, with the transducer being capable of reading such encodings.

Typically, thread-engaging member will comprise a sleeve surrounding the body portion, the sleeve carrying the second part of the displacement sensor (typically the scale).

The sleeve may be free to rotate around the body portion, but provided with a stop such that linear movement along the axis relative to the sleeve is restricted. The stop may comprise a retaining ring protruding from an outer surface of the body portion.

Furthermore, the sleeve will typically be fixed rotationally about the axis relative to the base. This will ensure that the two parts of the displacement sensor are appropriately rotationally located relative to one another as the thread-engaging member is screwed onto a threaded member, whilst still allowing the two parts to move linearly relative to one another along the axis, which is the displacement that it is desired to measure. As such, the sleeve may be provided with at least one guide pin protruding from the sleeve and the base may have at least one slot formed therein running along the axis; each guide pin may be received in a corresponding slot. Thus, the pin working in the slot will allow linear movement along the axis, but restrict rotational movement of the sleeve relative to the base.

The use of the sleeve ensures that the two parts of the displacement sensor are appropriately rotationally located relative to one another as the thread-engaging member is screwed onto a threaded member, whilst still allowing the two parts to move linearly relative to one another along the axis, which is the displacement that it is desired to measure. As such, rather than having to encode the entire surface of the thread-engaging part, the relative movement of the two parts of the encoder is constrained to be one-dimensional, thus allowing a simpler, smaller and hence cheaper encoder arrangement to be used. Furthermore, storage of the sensor part is improved and risk of damage minimised.

Furthermore, the use of a sleeve will further facilitate the use of multiple different thread engaging members; only the sleeve will need to have the encoder mounted thereon, with multiple different thread engaging members enabling the use of the tensioner with different diameter threaded members, without the need for each thread-engaging member to have its own encoder.

The displacement sensor may be provided with an output for the measured displacement. Typically, the output would comprise an output cable by means of which the measured displacement can be transmitted to a reader, display or other such terminal. However, for flexibility's sake, the output may be provided with a wireless transmitter whereby the measured displacement can be transmitted to a remote location.

Typically, the tensioner will be a hydraulic tensioner and will comprise a source of pressurised fluid in communication with the pressure space. The protrusion may be a flange on the thread-engaging member.

According to a second aspect of the invention, there is provided a combination of the tensioner of the first aspect of the invention and a threaded member, in which the thread-engaging member is engaged with a thread of the threaded member.

Thus, this represents the apparatus in use.

Typically, the second portion of the displacement sensor will be positioned axially along the body portion on a portion of the body portion that is engaged with the thread of the threaded member. As such, this reduces further any errors due to elastic deformation of the tensioner itself.

There now follows description of an embodiment of the invention, described with reference to the accompanying drawings referenced above in the Brief Description of the Several Views of the Drawings.

A hydraulic tensioner 1 in accordance with an embodiment of the invention is shown in the accompanying drawings. The tension can act to tension and so extend a threaded member of the form of a bolt or stud 2; a nut 3 can then be run down the bolt 2 in order to capture that tension.

The tensioner comprises a base 4, which forms a housing for the tensioner and will rest against a fixed surface. The tensioner also comprises a piston 6, which can move relative to base 4 along central axis 17 through a bore 20.

Between the base 4 and the piston 6 there is defined a pressure space 13. Hydraulic fluid can be introduced into this space by means of a system of ports 14. By doing so, the piston 6 can be forced away from the base 4; the piston 6 will move along axis 17, vertically in the sense of the Figures.

The piston 6 has a central through bore 20, coaxial with the axis 17. In this bore 20 there is provided a thread-engaging member 7. This thread-engaging member 7 comprises a body portion 8 of the form of a cylindrical sleeve that fits within the bore 20. The interior of the sleeve defines a threaded bore 30, which engages the threaded member 2.

The thread-engaging member 7 has a piston engaging portion 9 positioned at the end of the body portion 8. It forms a protrusion of the form of a flange, which abuts the piston 6 such that the force generated by the piston 6 being urged away from the base 4 is transmitted to the piston engaging portion 9, through body portion 8 and then through the threaded bore 20 to the threaded member 2. The nut 3 can then be run down threaded member 2 to keep the member 2 in tension and cause the nut 3 to press against the fixed surface once the tension due to the fluid in the pressure space 13 has been released.

However, it is desirable to be able to measure the elongation of the threaded member 2. In order to be able to do so, a sleeve 10 is provided around the external surface 5 of the body portion 8 of the thread-engaging member 7. The sleeve 10 is of the form of a cylindrical shell, coaxial with the axis 17. It is free to rotate relative to the thread-engaging member 7, but is retained against linear movement along the axis 17 by a retaining ring 27 protruding from the outer surface 5.

This sleeve 10 carries a magnetic encoder strip 11 along its length, mounted in a recess 21 in the outer surface of the sleeve 10. The magnetic encoder is of the form of a pattern of magnetic poles, so that a pattern of magnetic fields projection axially outwards from the sleeve 10 is created. The length of the magnetic encoder 11 is aligned parallel to the axis 17.

These magnetic fields can be read by a magnetic sensor 12 mounted in the base 4, which will typically be a Hall effect sensor. The magnetic sensor 12 is fixed relative to the base 4 by means of clamps 18. As the threaded member 2 is extended, the magnetic encoder 11 will move past the magnetic sensor 12; by appropriate processing of the output (through output cable 19) it will be possible to measure the movement of the thread-engaging member 7 relative to the base 4 and from that determine the elongation of the threaded member 2. In the simplest case, the measurement can involve simple counting of the reversals of the magnetic field as poles past, but the skilled man will appreciate that there are multiple ways in which position can be encoded magnetically.

Because the encoder is mounted low down on the body 8 of the thread-engaging member 7, fewer errors are introduced into the measurement due to the elastic elongation of parts of the tensioner 1 such as the thread-engaging member. It can be seen that the magnetic encoder 11 is fitted on a portion of the body portion 8 that is engaging the threaded member, and so by measuring at that point these errors can be minimised.

However, in order to align the magnetic encoder 11 angularly with the magnetic sensor 12, the sleeve 10 is provided with two protruding pins 15. These are received within corresponding elongate slots 16 in the base 4, the slots running parallel to the axis 17. As such, this substantially prevents the sleeve 10 from rotating about the axis 17 relative to the base 4 (although it can rotate relative to the thread-engaging member 7) whilst allowing the linear movement along the axis that it is desired to measure.

As such, the thread-engaging member 7 can be screwed onto the threaded member 2 without having to be concerned about the angular orientation of the magnetic encoder 11 relative to the magnetic sensor 12, as the pins 15 will ensure that that alignment is correct. If the magnetic encoder were directly carried on the body portion 8 of the thread-engaging member 7, then it would be necessary to ensure that the thread-engaging member was rotated to the correct position relative to the base on every installation, which would be labour-intensive and prone to inaccuracy.

The output signal from the magnetic sensor 12 can be read out from output cable 19 and directed to a suitable processor. Whilst the processor, or the processed results, can be located local to the tensioner 1, it is also possible that the raw output signals or the processed results, or any intermediate results, could be transmitted wirelessly to a base station remote from the tensioner. This would be particularly useful where several tensioners were being used together (as such may be used in the bolts securing a wind turbine to the ground, or securing the turbine blades onto the nacelle) and it allows monitoring of several operations simultaneously, and also more flexibly recording the results for traceability's sake.

Whilst the sleeve of this embodiment is fixed rotationally relative to the base, in another embodiment, it is possible to have the sleeve not rotationally fixed, so that the sleeve is free to rotate around the base. In such a case, the encoder would encompass the entire circumferential surface of the sleeve, so that the elongation measurement could be taken regardless of the rotational relationship between the sleeve and the magnetic sensor. In this embodiment, the sleeve would provide the advantage that it the sleeve could be used with multiple different thread-engaging members, rather than requiring each thread-engaging member (or each puller bar) for different sized threads having to be provided with the encoder; thus, only one item needs to be encoded, rather than multiple items.

The invention claimed is:

1. A tensioner for threaded members, the tensioner comprising:
   a base and a piston defining a pressure space therebetween, the base and piston being arranged to be urged apart along an axis upon introduction of a fluid into the pressure space; and
   a thread-engaging member, comprising a body portion having a threaded interior for engagement with a threaded member, a piston engaging portion carrying a protrusion, and a sleeve surrounding the body portion;
   in which the piston bears against the protrusion such that the piston exerts a force on the protrusion when urged apart from the base by the introduction of fluid into the pressure space;
   the tensioner further comprising a displacement sensor arranged for determining the relative position of the body portion of the thread-engaging member and the base, the displacement sensor comprising a first part carried on the base and a second part carried on the sleeve of the thread-engaging member;
   in which the sleeve is free to rotate around the body portion, but provided with a stop such that linear movement along the axis relative to the sleeve is restricted.

2. The tensioner of claim 1, in which the sleeve is fixed rotationally about the axis relative to the base.

3. The tensioner of claim 2, in which the sleeve is provided with at least one guide pin protruding from the sleeve and the base has at least one slot formed therein running along the axis, each guide pin being received in a corresponding slot.

4. The tensioner of claim 1, in which the displacement sensor is provided with an output for measured displacement, the output being provided with a wireless transmitter whereby the measured displacement can be transmitted to a remote location.

5. The tensioner of claim 1, being a hydraulic tensioner comprising a source of pressurised fluid in communication with the pressure space.

6. A tensioner for threaded members, the tensioner comprising:
   a base and a piston defining a pressure space therebetween, the base and piston being arranged to be urged apart along an axis upon introduction of a fluid into the pressure space; and
   a thread-engaging member, comprising a body portion having a threaded interior for engagement with a threaded member, a piston engaging portion carrying a protrusion, and a sleeve surrounding the body portion;
   in which the piston bears against the protrusion such that the piston exerts a force on the protrusion when urged apart from the base by the introduction of fluid into the pressure space;
   the tensioner further comprising a displacement sensor arranged for determining the relative position of the body portion of the thread-engaging member and the base, the displacement sensor comprising a first part carried on the base and a second part carried on the sleeve of the thread-engaging member;

in which the displacement sensor is a linear encoder, in which the second part comprises a scale that encodes a position and the first part is a transducer that reads the scale.

7. The tensioner of claim 6, in which the scale is a magnetic encoder, with the scale encoded magnetically and in which the transducer is a magnetic field sensor.

8. The tensioner of claim 6, in which the displacement sensor is provided with an output for measured displacement, the output being provided with a wireless transmitter whereby the measured displacement can be transmitted to a remote location.

9. The tensioner of claim 6, being a hydraulic tensioner comprising a source of pressurised fluid in communication with the pressure space.

10. A combination, comprising:
a tensioner; and
a threaded member,
in which the tensioner comprises:
a base and a piston defining a pressure space therebetween, the base and piston being arranged to be urged apart along an axis upon introduction of a fluid into the pressure space; and
a thread-engaging member, comprising a body portion having a threaded interior for engagement with a threaded member, a piston engaging portion carrying a protrusion, and a sleeve surrounding the body portion;
in which the piston bears against the protrusion such that the piston exerts a force on the protrusion when urged apart from the base by the introduction of fluid into the pressure space;
the tensioner further comprising a displacement sensor arranged for determining the relative position of the body portion of the thread-engaging member and the base, the displacement sensor comprising a first part carried on the base and a second part carried on the sleeve of the thread-engaging member;
in which the sleeve is free to rotate around the body portion, but a stop is provided to prevent linear movement of the sleeve along the axis relative to the body portion; and
in which the thread-engaging member is engaged with a thread of the threaded member.

11. The combination of claim 10, in which the second part of the displacement sensor is positioned axially along the sleeve of the thread-engaging member.

12. The combination of claim 10, in which the sleeve is fixed rotationally about the axis relative to the base.

13. The combination of claim 12, in which the sleeve is provided with at least one guide pin protruding from the sleeve and the base has at least one slot formed therein running along the axis, each guide pin being received in a corresponding slot.

14. The combination of claim 10, in which the displacement sensor is provided with an output for measured displacement, the output being provided with a wireless transmitter whereby the measured displacement can be transmitted to a remote location.

15. The combination of claim 10, wherein the tensioner is a hydraulic tensioner comprising a source of pressurised fluid in communication with the pressure space.

16. A combination, comprising:
a tensioner; and
a threaded member,
in which the tensioner comprises:
a base and a piston defining a pressure space therebetween, the base and piston being arranged to be urged apart along an axis upon introduction of a fluid into the pressure space; and
a thread-engaging member, comprising a body portion having a threaded interior for engagement with a threaded member, a piston engaging portion carrying a protrusion, and a sleeve surrounding the body portion;
in which the piston bears against the protrusion such that the piston exerts a force on the protrusion when urged apart from the base by the introduction of fluid into the pressure space;
the tensioner further comprising a displacement sensor arranged for determining the relative position of the body portion of the thread-engaging member and the base, the displacement sensor comprising a first part carried on the base and a second part carried on the sleeve of the thread-engaging member;
in which the displacement sensor is a linear encoder, in which the second part comprises a scale that encodes a position and the first part is a transducer that reads the scale; and
in which the thread-engaging member is engaged with a thread of the threaded member.

17. The combination of claim 16, in which the second part of the displacement sensor is positioned axially along the sleeve of the thread-engaging member.

18. The combination of claim 16, in which the scale is a magnetic encoder, with the scale encoded magnetically and in which the transducer is a magnetic field sensor.

19. The combination of claim 16, in which the displacement sensor is provided with an output for measured displacement, the output being provided with a wireless transmitter whereby the measured displacement can be transmitted to a remote location.

20. The combination of claim 16, wherein the tensioner is a hydraulic tensioner comprising a source of pressurised fluid in communication with the pressure space.

* * * * *